(12) United States Patent
Lee et al.

(10) Patent No.: US 9,103,377 B2
(45) Date of Patent: Aug. 11, 2015

(54) SELF LUBRICATING ROBUST CENTRALIZER BEARING DESIGN AND METHOD OF USE

(71) Applicants: Marcus Hong Yeow Lee, Houston, TX (US); Jerome Dubus, La Riche (FR); Sebastien Lecluse, Gruffy (FR); Frans Grove, Chalfont, PA (US); Parveen Chandila, Houston, TX (US); Christian Boch, Chambery (FR)

(72) Inventors: Marcus Hong Yeow Lee, Houston, TX (US); Jerome Dubus, La Riche (FR); Sebastien Lecluse, Gruffy (FR); Frans Grove, Chalfont, PA (US); Parveen Chandila, Houston, TX (US); Christian Boch, Chambery (FR)

(73) Assignee: AKTIEBOLAGET SKF, Gothenburg (SE)

( * ) Notice: Subject to any disclaimer, the term of this patent is extended or adjusted under 35 U.S.C. 154(b) by 54 days.

(21) Appl. No.: 14/136,028

(22) Filed: Dec. 20, 2013

(65) Prior Publication Data

US 2015/0176647 A1  Jun. 25, 2015

(51) Int. Cl.
F16C 33/66 (2006.01)
F16C 35/04 (2006.01)

(52) U.S. Cl.
CPC ........... F16C 33/6681 (2013.01); F16C 35/042 (2013.01)

(58) Field of Classification Search
CPC ....... F16C 31/00; F16C 31/04; F16C 33/6659
See application file for complete search history.

(56) References Cited

U.S. PATENT DOCUMENTS

2006/0104553 A1* 5/2006 Faust et al. ...................... 384/49
2010/0000830 A1* 1/2010 Budde et al. ............ 188/218 XL

* cited by examiner

Primary Examiner — Thomas R. Hannon
(74) Attorney, Agent, or Firm — Mark Ussai; SKF USA Inc. Patent Dept.

(57) ABSTRACT

A bearing lubricating housing (100) comprising a lubricating housing body (110). The bearing housing (100) is designed to retain a rolling element bearing assembly (200) while providing axial motion when the housing (100) is assembled within an interior of a guiding tube (310). The bearing housing (100) includes a series of channels (118) and/or passageways (114, 116) forming a lubrication matrix for collecting a lubricant from an interior surface (312) of the guiding tube (310) to the rolling element bearing assembly (200).

23 Claims, 16 Drawing Sheets

SELF LUBRICATING ROBUST CENTRALIZER BEARING DESIGN AND METHOD OF USE

BACKGROUND OF THE INVENTION

1. Field of the Invention

The present invention relates to a self lubricating bearing configuration. More specifically, the self lubricating bearing assembly integrates a lubrication system into a bearing carrier, wherein the bearing carrier collects a lubricant from a surface of a guiding tube during an axial motion and transfers the collected lubricant to the bearing.

2. Discussion of the Related Art

Bearings integrate an outer ring, an inner ring, and a plurality of rolling elements assembled therebetween. The assembly enables ration of one ring respective to the other ring. The outer ring is inserted into an interior of a first element and a second element is inserted into an interior diameter of the inner ring. This configuration enables controlled rotation of the first element and second element respective to one another.

Bearings are employed in a wide variety of applications. The applications can vary from an occasional use to continuous commercial operations. Bearings comprise rolling elements that rotate against a bearing raceway of each of the inner ring and the outer ring. The longevity and reliability of the bearings can be enhanced through maintenance, which includes lubrication. Many of the bearing applications have a negative impact on lubrication. Commercial operations are desired to minimize downtime, thus limiting any time available for maintenance; including lubrication. Other applications integrate the bearings into complex assemblies. The complex assemblies are generally difficult and time consuming to dismantle to access and lubricate the bearings.

Centralizer bearings are employed to guide and retain rotating components in a radial direction. The centralizer bearings can also be employed in an axial direction by enabling a sliding motion. Centralizer bearings can be integrated into complex assemblies, making lubrication difficult. The motion of elements within the system and location of the centralizer bearing further aggravates the potential for solutions for lubricating the centralizer bearing. Lubrication may be applied to one portion of the assembly, but is not easily transferred to the opposite part of the assembly to lubricate the centralizer bearing.

Thus, what is desired is a simple, self-lubricating solution for applying a lubricant to a centralizer bearing or any other bearing integrated into a complex machine.

The solution provides several advantages, including reduced downtime for maintenance. The continuous lubrication ensures the bearing remains properly and adequately lubricated during extending periods of operation. The self-lubrication increases the time period for operation, thus increasing equipment uptime. The increased uptime increases productivity and the return on investment of the equipment. The self-lubricating design retains the lubricant within the machine, resulting in a cleaner maintained machine. Grease and other lubricants that could accumulate on exterior surfaces of the equipment attract and retain dirt and other contaminants. The dirt and other contaminants can creep into areas between moving parts increasing friction and wear. The contaminants can prematurely degrade the elements of the equipment causing premature failure.

SUMMARY OF THE INVENTION

The present invention is directed towards a bearing housing having features to self-lubricate a bearing integrated therein.

In a first aspect of the present invention, a bearing housing comprises:
an elongated tubular structure comprising an outer surface and an inner surface;
at least one sliding surface provided on the elongated tubular structure outer surface, wherein the at least one sliding surface is sized, shaped, and fabricated of a material suitable for sliding within a guiding tube along an axial direction;
at least one lubrication collection groove formed on the elongated tubular structure outer surface, wherein the lubrication collection groove is arranged in at least one of:
an axial direction,
a spiraling direction, spiraling about at least a portion of an axial length of the elongated tubular structure outer surface,
a multi-directional pattern having grooves formed in both axial and circumferential directions, and
a multi-directional pattern having grooves formed in a first angled direction and a second, generally perpendicular angled direction; and
a radial conduit extending between the at least one lubrication collection groove and the elongated tubular structure inner surface.

In a second aspect of the present invention, the elongated tubular structure inner surface is designed to receive a rolling element bearing.

In another aspect, the elongated tubular structure inner surface further comprises features for retaining a rolling element bearing therein. The features can include an inner radially defined surface, at least one spring clip retention slot, an axial direction retaining surface, and the like.

In yet another aspect, at least one slide assisting material can be assembled to an exterior surface of the bearing housing to enhance an axial sliding motion.

In yet another aspect, at least one low friction coefficient material can be assembled to an exterior surface of the bearing housing to enhance an axial sliding motion.

In yet another aspect, the low friction coefficient material can be a nylon ring.

In yet another aspect, the low friction coefficient material can be a glass fiber filled.

In yet another aspect, the low friction coefficient material can be a Polytetrafluoroethylene (PTFE).

In yet another aspect, the low friction coefficient material can be a carbon filled nylon ring.

In yet another aspect, the low friction coefficient material can be a lubricant impregnated ring.

In yet another aspect, the low friction coefficient material can be a graphite impregnated ring.

In yet another aspect, the radial conduit can extend through the bearing housing body.

In yet another aspect, the radial conduit can extend along an exterior surface of the bearing housing body.

In yet another aspect, the bearing housing body can further comprise an axially oriented conduit for transferring collected lubricant in an axial direction. The axially oriented conduit can be in fluid communication with at least one radial conduit.

In yet another aspect, the radial conduit extends radially along the exterior surface of the bearing housing body.

In yet another aspect, the radial conduit extends radially along the exterior surface of the bearing housing body, wherein the exterior surface forms a plane that is generally perpendicular to a longitudinal axis of the bearing housing body.

In yet another aspect, the radial conduit extends radially along the exterior surface of the bearing housing body, wherein the exterior surface has a frustum shape, having a smaller diameter portion of the surface extending inward;

In yet another aspect, the bearing is lubricated using a combination of grease and oil.

In yet another aspect, the bearing housing body collects lubricant from an interior surface of a guiding tube. The guiding tube can include features for transporting a lubricant to an interior surface thereof.

In yet another aspect, the bearing housing body collects lubricant from an interior surface of a guiding tube during a sliding motion, wherein the sliding motion is parallel to a longitudinal axis.

In yet another aspect, a self-lubricating bearing subassembly combines the rolling element bearing and the bearing lubricating housing into a single subassembly.

In yet another aspect, a self-lubricating bearing subassembly combines the rolling element bearing, the bearing lubricating housing, and at least one low friction coefficient material applied to an exterior surface of the bearing housing forming a single subassembly.

These and other features, aspects, and advantages of the invention will be further understood and appreciated by those skilled in the art by reference to the following written specification, claims and appended drawings, which follow.

BRIEF DESCRIPTION OF THE DRAWINGS

For a fuller understanding of the nature of the present invention, reference should be made to the accompanying drawings in which.

Like reference numerals refer to like parts throughout the several views of the drawings.

DETAILED DESCRIPTION OF REPRESENTATIVE EMBODIMENTS

Figure 1:
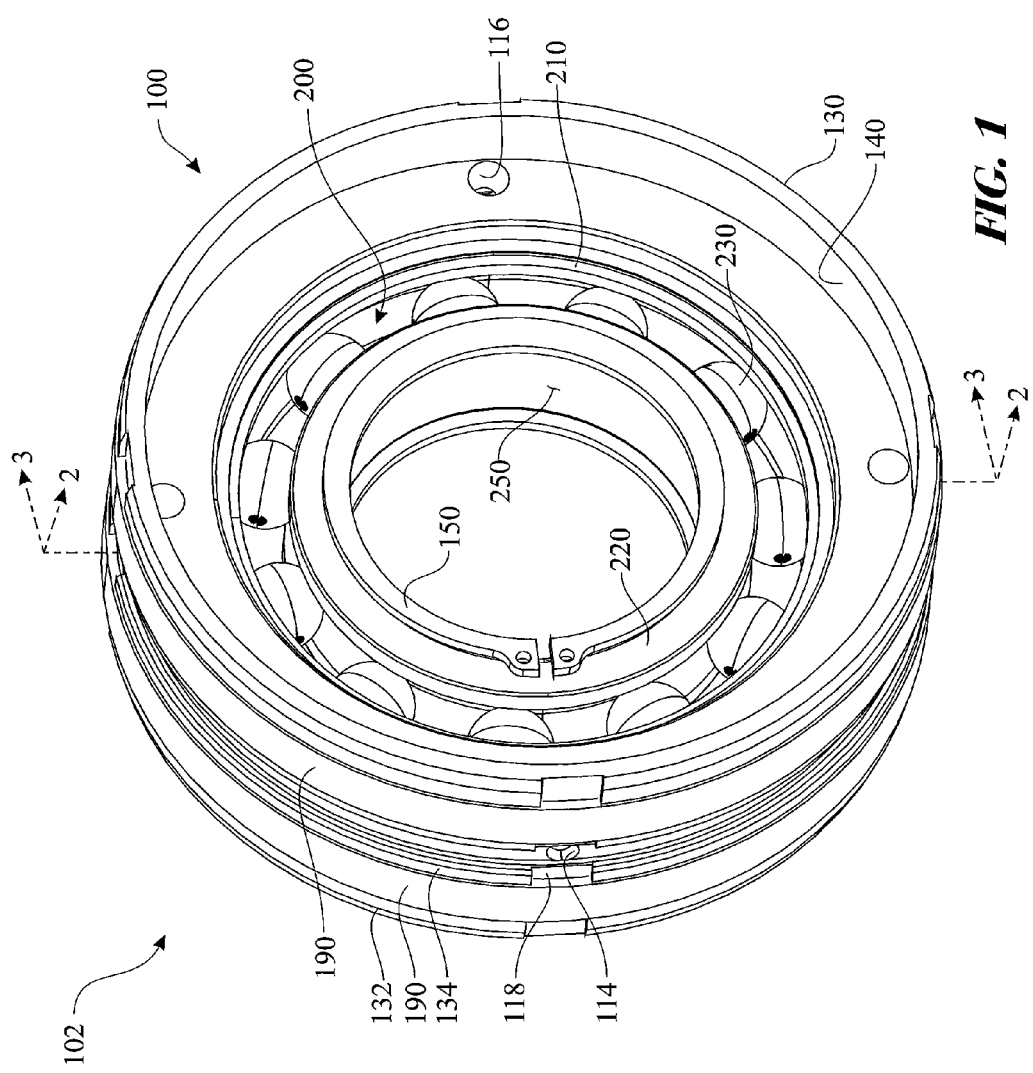
FIG. 1 presents an isometric assembly view of an exemplary self lubricating bearing subassembly comprising a rolling element bearing assembled within a lubricating sliding bearing housing.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the teens "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

A rolling element bearing 200 is assembled within a bearing seat of a bearing lubricating housing 100 forming a self lubricating bearing subassembly 102, as illustrated in FIGS. 1-4, wherein the bearing lubricating housing 100 provides continuous lubrication to the rolling element bearing 200 during operation of the subassembly 102. The rolling element bearing 200 comprises a bearing outer ring 210, a bearing inner ring 220, and a plurality of bearing rotational elements 230 assembled therebetween. Each of the bearing outer ring 210 and the bearing inner ring 220 include a raceway 212, 222 on opposing surfaces. Each raceway 212, 222 is shaped to receive and retain the plurality of bearing rotational elements 230 between the bearing outer ring 210 and bearing inner ring 220 in a manner enabling the bearing outer ring 210 and bearing inner ring 220 to rotate respective to one another. Each of the bearing rotational elements 230 can be designed having any suitable shape, including a spherical shape, a cylindrical shape, frustum shape, and the like. A bearing inner surface 250 of the bearing inner ring 220 defines a bore passing therethrough. The bearing inner surface 250 is preferably concentric with the bearing raceway and an exterior surface of the bearing outer ring 210. The bore is sized and shaped to engage with a shaft or other element.

The bearing lubricating housing 100 is fabricated by forming a bearing lubricating housing body 110. The bearing lubricating housing body 110 is shaped defining a peripheral outer surface and a bearing radial seating surface 120 for receiving and seating the rolling element bearing 200 in a radial direction. The bearing radial seating surface 120 would be designed having a size and shape that is compatible for receiving an exterior surface of the rolling element bearing 200. It would be preferred that the bearing radial seating surface 120 have a circular shape. The bearing radial seating surface 120 would preferably be of a size and shape providing a tight or press fit with the respective target sized rolling element bearing 200. The bearing lubricating housing body 110 can optionally include an axial retention surface or flange for receiving and seating the rolling element bearing 200 in an axial direction.

The bearing lubricating housing body 110 can optionally include a rotational element housing radial retention surface 140 for radially engaging with a separate element, for clearance of another element, and the like. The rotational element housing radial retention surface 140 can extend a length of the outer surface of the bearing lubricating housing body 110 reducing any potential for rotation or twist of the bearing lubricating housing body 110 when subjected to an axial force and/or motion.

Figure 2:
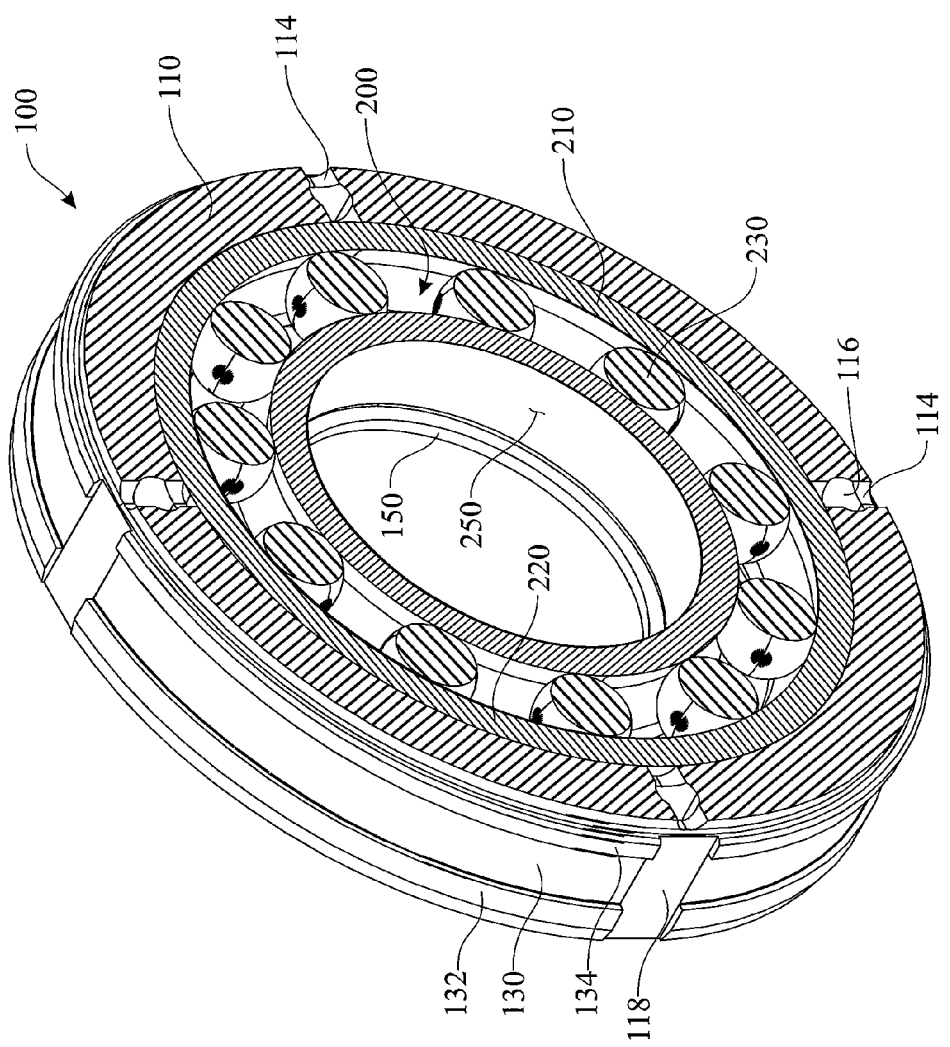
FIG. 2 presents a sectioned end view of the self lubricating bearing subassembly, wherein the section is taken along section line 2-2 of FIG. 1, or along an radial plane extending through a plurality of rolling elements across a diameter thereof.
Figure 3:
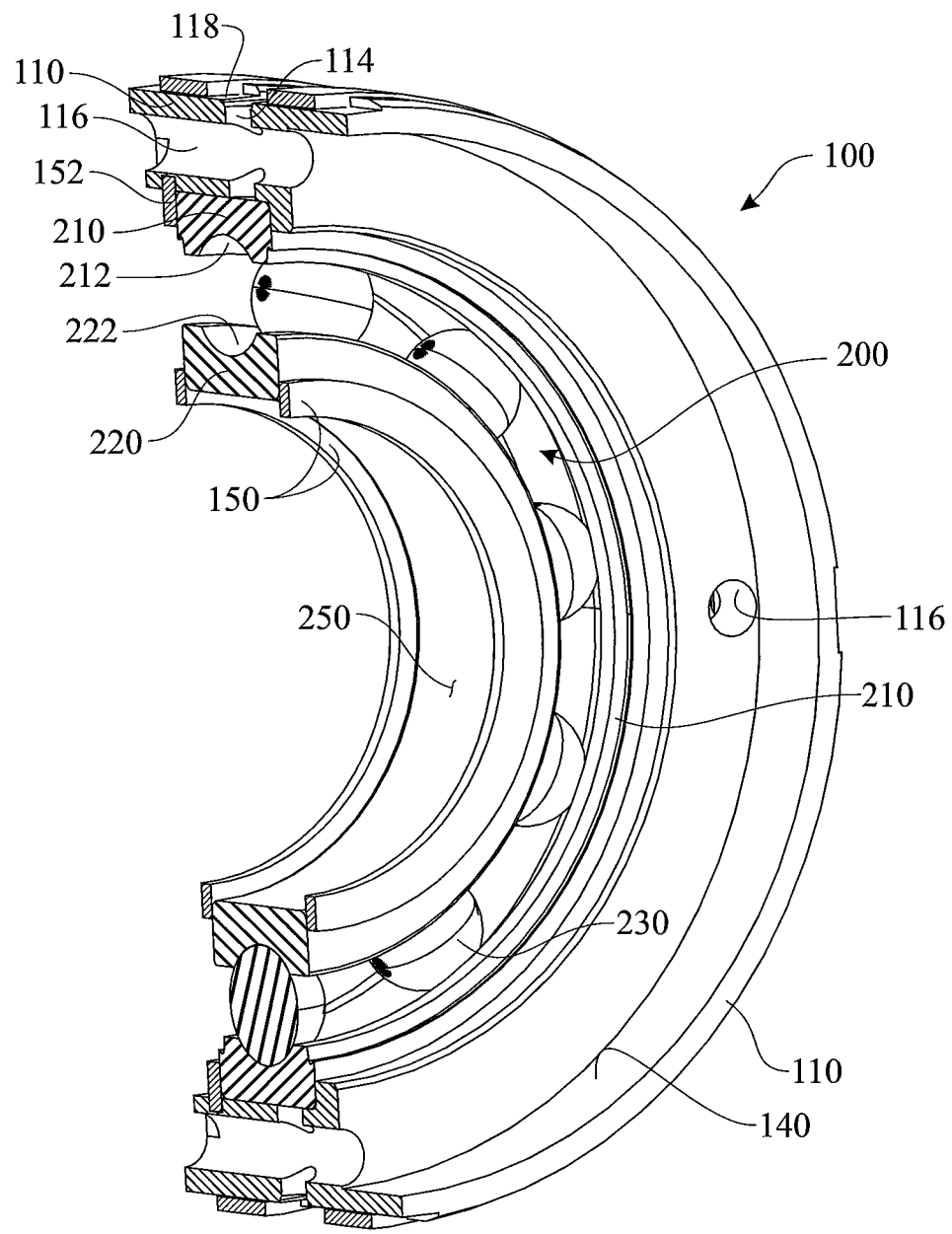
FIG. 3 presents a sectioned isometric view of the self lubricating bearing subassembly, wherein the section is taken along section line 3-3 of FIG. 1, or along an axial direction across a diameter thereof.
Figure 4:
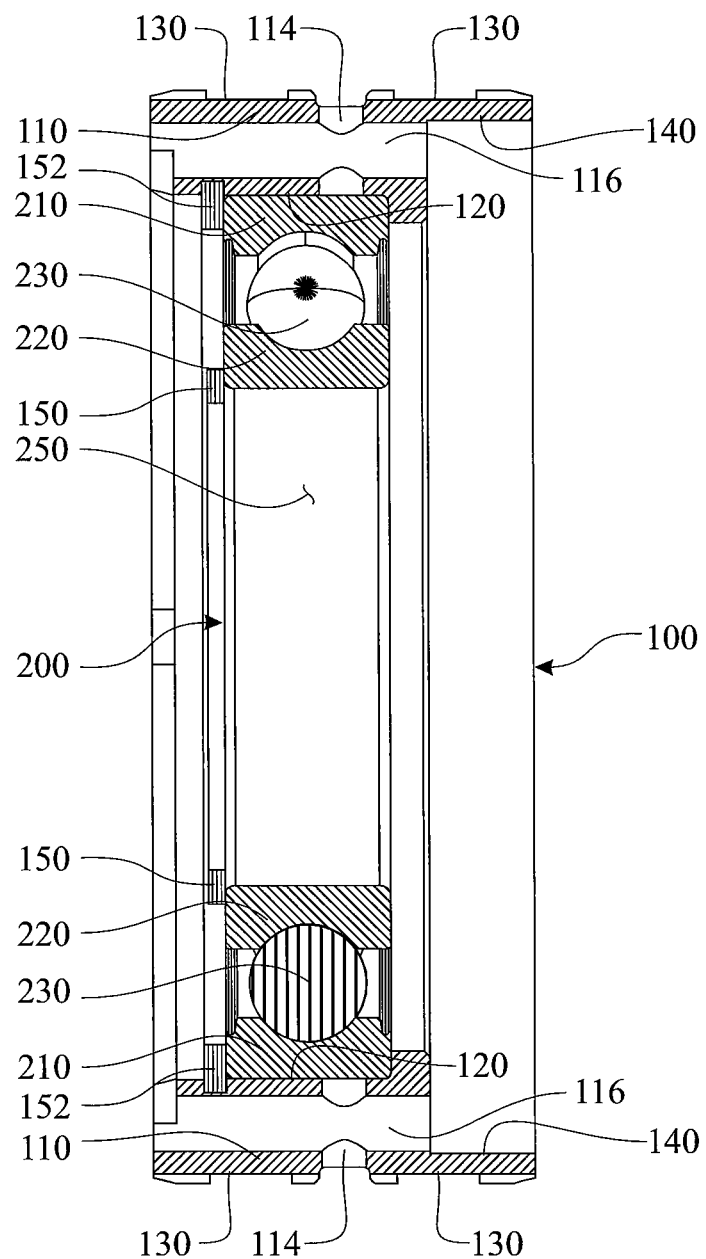
FIG. 4 presents a sectioned side view of the self lubricating bearing subassembly, wherein the section is taken along section line 3-3 of FIG. 1, or along an axial direction across a diameter thereof.
Figure 5:
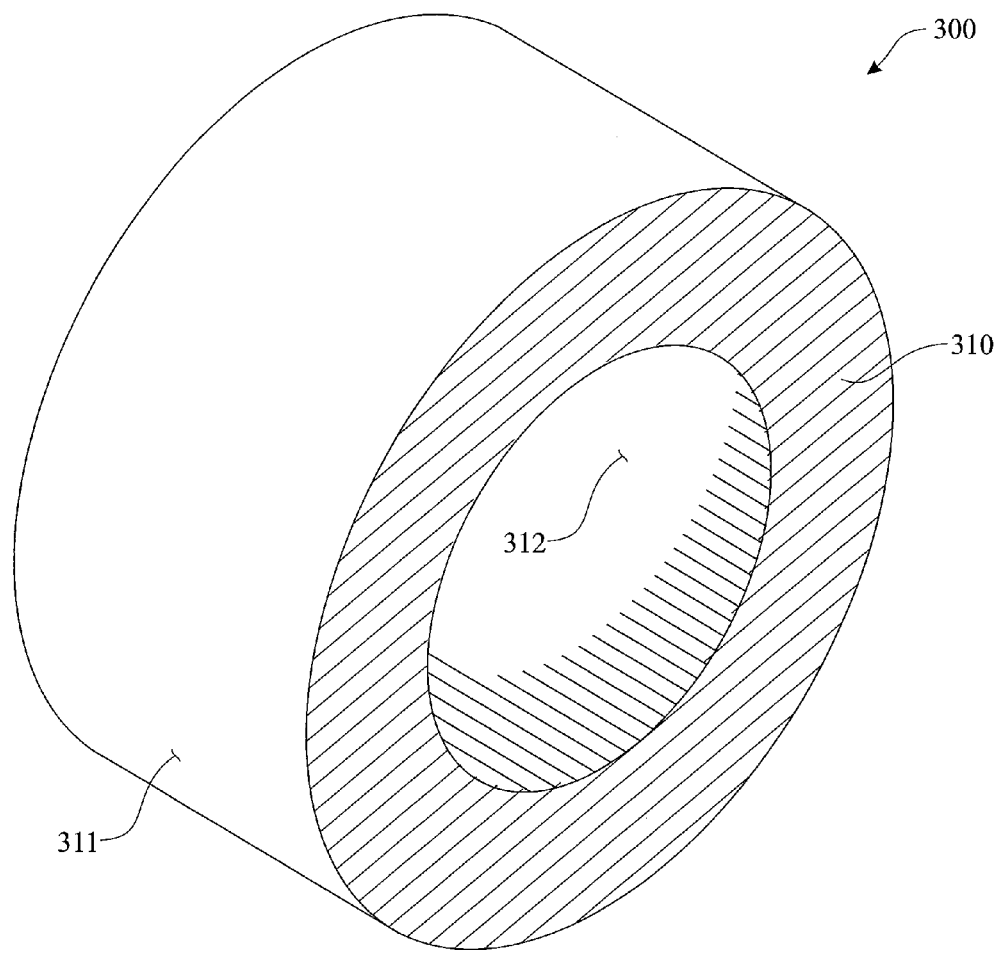
FIG. 5 presents a sectioned isometric view of an exemplary guiding tube, wherein the section is taken along a radial plane.
Figure 6:
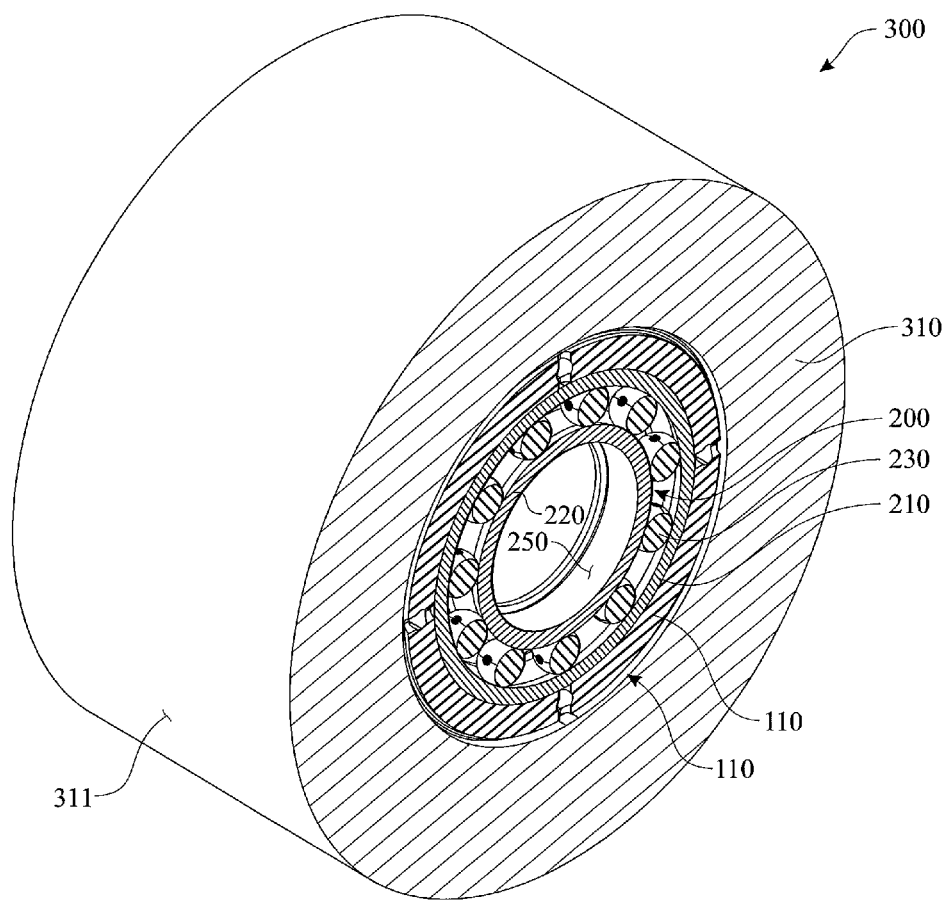
FIG. 6 presents a sectioned isometric view of the exemplary guiding tube as introduced in FIG. 5, having the self lubricating bearing assembly assembled within an interior portion thereof.

Functionally, the exterior surface of the bearing lubricating housing body 110 is sized and shaped to slideably engage with an bearing guiding tube interior surface 312 of a bearing guiding tube 310 (FIGS. 5 and 6). At least one lubrication collection path 118 is integrally formed into the exterior surface of the bearing lubricating housing body 110 as illustrated in FIG. 2. In the exemplary embodiment, each of the at least one lubrication collection paths 118 is oriented generally axial. A radial lubrication passageway 114 extends radially inward from each lubrication collection path 118 partially or completely through the bearing lubricating housing body 110.

It is understood that the bearing outer ring 210 is preferably continuous to provide a smooth raceway for undisturbed motion of the rolling elements 230. Therefore, the bearing outer ring 210 would block any flow or discharge of lubricant from the radial lubrication passageway 114. This can be accommodated by integration of at least one axial lubrication passageway 116. Alternatively, each radial lubrication passageway 114 would be located in registration with one or both faces of the rolling element bearing 200, directing discharge of the lubricant to one or both faces of the rolling element bearing 200. The lubricant would flow about the bearing outer edge retention clip 152 and into the region spanning between the bearing outer ring 210 and bearing inner ring 220 providing lubrication to the bearing rotational elements 230. The bearing lubricating housing body 110 can be designed to provide a space along one or both faces of the rolling element bearing 200 for transfer of the lubricant.

A axial lubrication passageway 116 can be integrated into the bearing lubricating housing body 110, wherein the axial lubrication passageway 116 extends axially therethrough. The axial lubrication passageway 116 would be in fluid communication with the radial lubrication passageway 114. The radial lubrication passageway 114 provides a fluid conduit to transfer fluid from the lubrication collection path 118 and/or the axial lubrication passageway 116 to the rolling element bearing 200, enabling self-lubrication during motion of the bearing lubricating housing 100 and/or rolling element bearing 200. The axial lubrication passageway 116 can extend through the bearing lubricating housing body 110 or along the bearing radial seating surface 120. In another alternative, the exterior surface of the bearing outer ring 210 can include grooves, channels, or any other suitable feature for transfer of the lubricant to the bearing rotational elements 230. The designer would be able to utilize the concept to determine the optimal and preferred configuration of channels and orifices to collect the lubricant and transport the lubricant from the bearing guiding tube interior surface 312 to the rolling element bearing 200.

The rolling element bearing 200 is seated within the bearing radial seating surface 120 of the bearing lubricating housing 100. The rolling element bearing 200 can be placed against the axial retention surface or flange to retain the rolling element bearing 200 in an axial direction. A bearing outer edge retention clip 152 can be installed within a groove located proximate a side of the rolling element bearing 200 opposite to the axial retention surface or flange to secure the rolling element bearing 200 in location.

Figure 7:
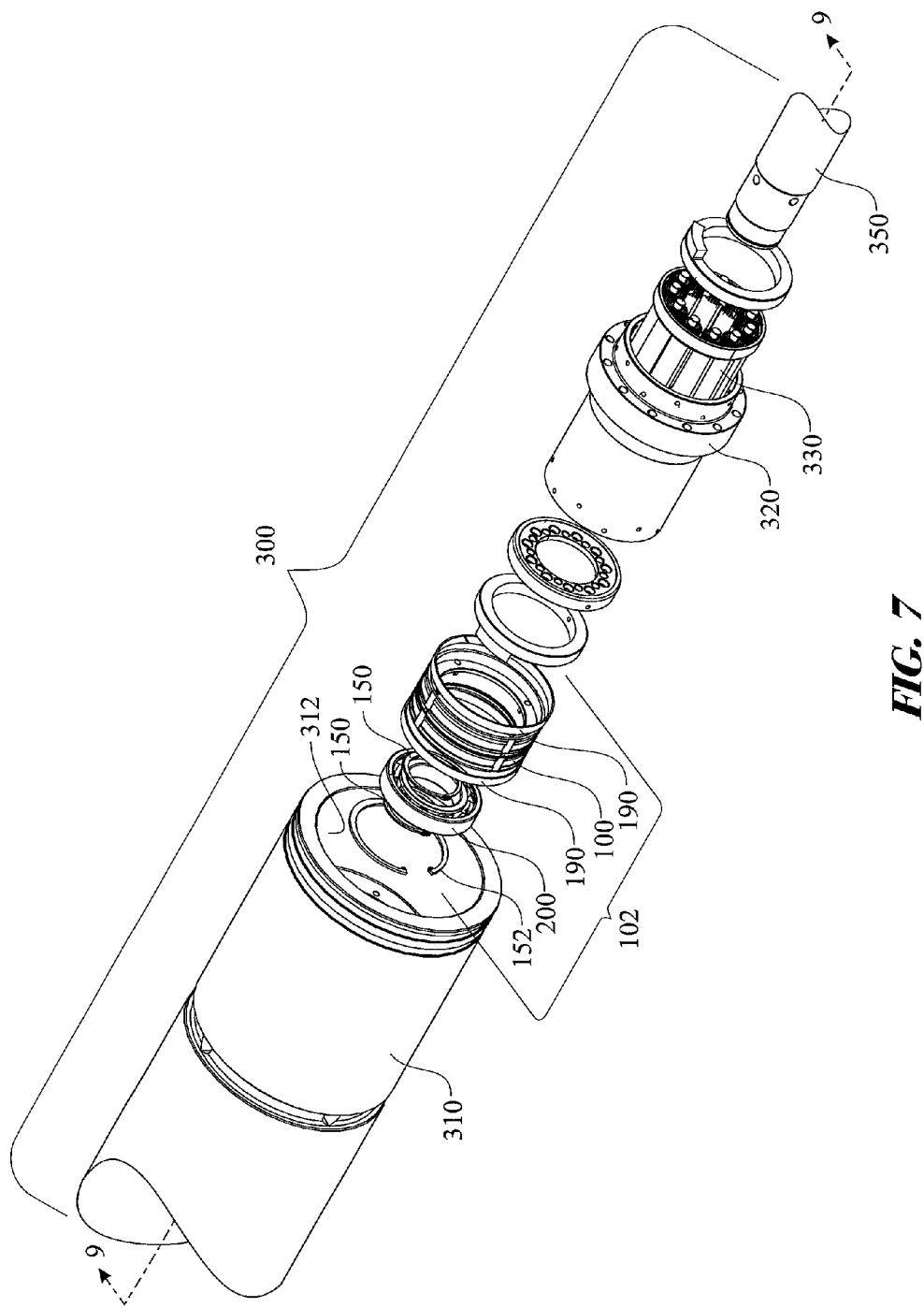
FIG. 7 presents an exploded isometric assembly view of the exemplary self lubricating bearing subassembly being integrated into a complex mechanical assembly.
Figure 8:
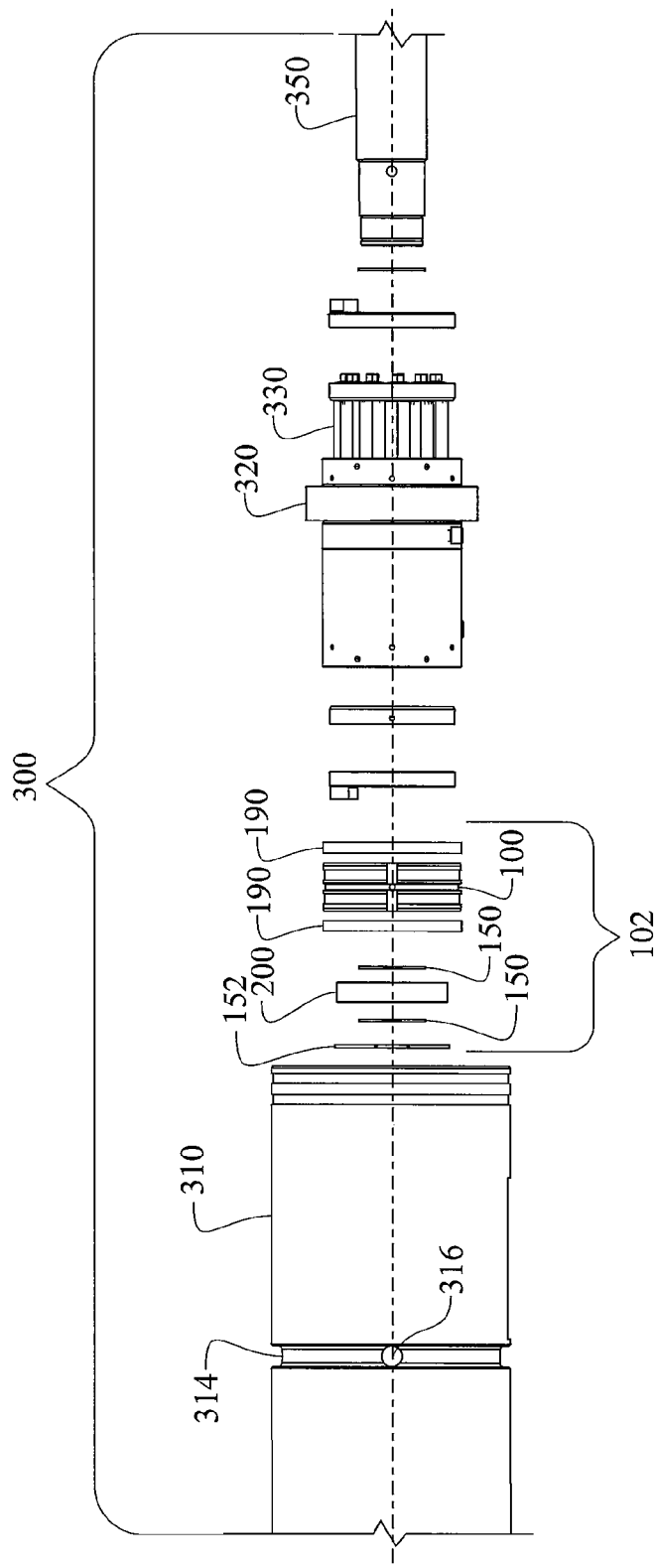
FIG. 8 presents an exploded side assembly view of the complex mechanical assembly comprising the self lubricating bearing subassembly.
Figure 9:
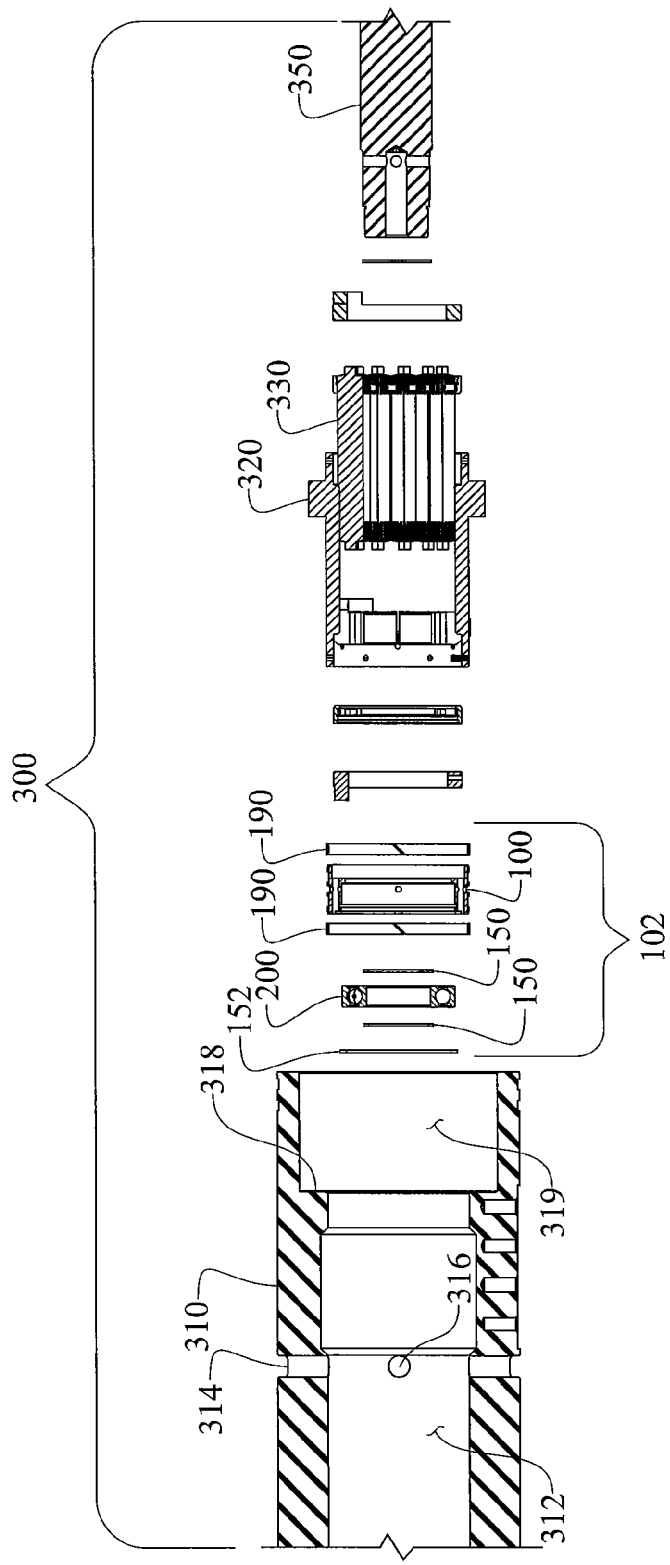
FIG. 9 presents an sectioned side exploded assembly view of the complex mechanical assembly comprising the self lubricating bearing subassembly, wherein the section is taken along section line 9-9 of FIG. 7, along a central longitudinal axis.
Figure 10:
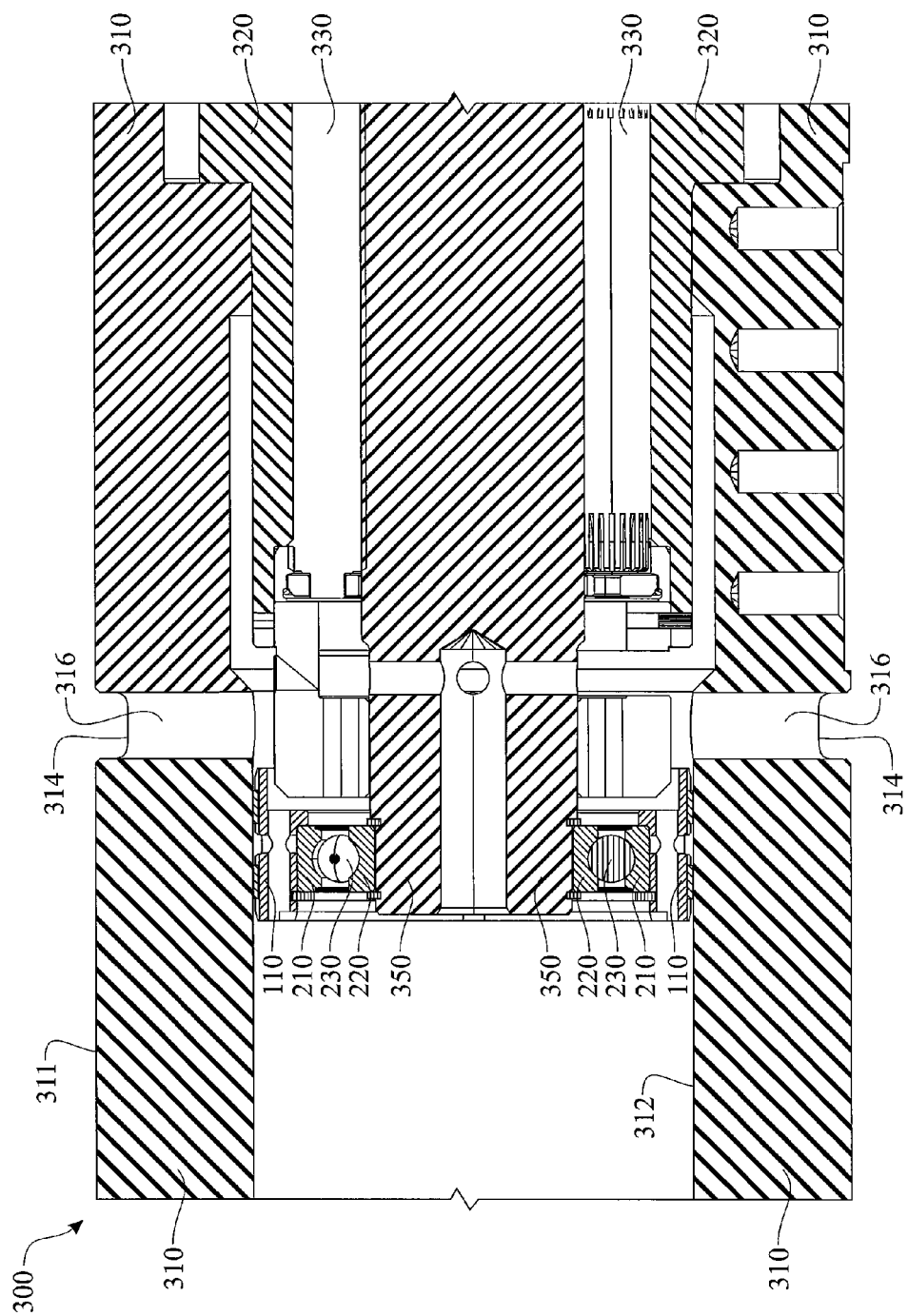
FIG. 10 presents a magnified sectioned side assembly view of the complex mechanical assembly comprising the self lubricating bearing subassembly, wherein the section is taken along the central longitudinal axis.

Alternatively, the rolling element bearing 200 can be secured in a proper position within the bearing lubricating housing 100 by inserting each of a pair of bearing outer edge retention clips 152 into respective receiving slots formed within the bearing radial seating surface 120 of the bearing lubricating housing 100. One or more bearing inner edge retention clips 150 can be employed to retain the rolling element bearing 200 in position on a rotating machine shaft 350 (FIG. 7).

At least one slide ring receiving groove 130 can be formed about an exterior peripheral surface of the bearing lubricating housing body 110 for receiving a bearing exterior slide ring 190, as illustrated in FIG. 1. The slide ring receiving groove 130 would span between a first slide ring registration ridge 132 and a second slide ring registration ridge 134. The bearing exterior slide ring 190 can be fabricated having any suitable shape and features for installing the bearing exterior slide ring 190 about the slide ring receiving groove 130. In the exemplary embodiment, each bearing exterior slide ring 190 is fabricated having a diagonal slit enabling the bearing exterior slide ring 190 to slip over the first slide ring registration ridge 132 and onto the slide ring receiving groove 130.

The bearing guiding tube 310 can include features for applying and routing lubricant to the bearing guiding tube interior surface 312. In the exemplary embodiment, a lubrication feed radial port 314 is formed about an exterior circumference of the. At least one lubrication feed axial orifice 316 can extend from the lubrication feed radial port 314 to the bearing guiding tube interior surface 312, providing a conduit for flow or transfer of lubricant applied to the lubrication feed radial port 314 to the bearing guiding tube interior surface 312. It is understood that any suitable feature or series of features can be integrated into the bearing guiding tube 310 for application and transport of lubricant for maintenance of the rolling element bearing 200.

The self lubricating bearing subassembly 102 would be inserted into a bearing guiding tube interior surface 312 of a machine assembly 300 as illustrated in FIGS. 5 and 6 or in detailed FIGS. 7 through 13. Functionally, the rolling element bearing 200 slides in accordance with a bearing assembly sliding motion 199 (FIG. 11) within the bearing guiding tube interior surface 312. The motion is enhance by including one or more bearing exterior slide rings 190. The bearing exterior slide ring 190 can be fabricated of any low friction coefficient material, including nylon, a glass reinforced nylon, a glass reinforced nylon filled with 40% glass fiber, a nylon polyimide, a glass reinforced nylon polyimide, a carbon filled nylon, a lubricant impregnated material, a graphite impregnated material, and the like. As the bearing lubricating housing 100 slides, lubricant is collected from the bearing guiding tube interior surface 312 of the bearing guiding tube 310. The lubricant is collected by each lubrication collection path 118. The bearing exterior slide rings 190 can aid in collected of the lubricant from the bearing guiding tube interior surface 312 as the bearing exterior slide rings 190 passes across the bearing guiding tube interior surface 312. The lubricant is transferred to the rolling element bearing 200 through each radial lubrication passageway 114. At least one axial lubrication passageway 116 can be utilized to collect and/or transfer lubricant. The axial lubrication passageway 116 can transfer the lubricant to each of a front face and a rear face of the rolling element bearing 200, enabling the lubricant to flow onto the bearing rotational elements 230.

One exemplary application of the present invention is illustrated in FIGS. 7 through 13. A rotating machine shaft 350 is rotationally assembled to a bearing guiding tube 310 by a rolling element bearing 200 and a rotational element 330. The rotating machine shaft 350 is inserted into a central passage formed through a rotational element 330. The rotational element 330 is positioned at a location along a central shaft section of the rotating machine shaft 350. The rotational element 330 is inserted into an interior receiving section provided within a rotational element housing 320. The rotational element housing 320 can include a flange for axial retention thereof within the bearing guiding tube interior surface 312. The flange can axially engage with a rotational element housing axial retention surface 318 (FIG. 11) of the bearing guiding tube 310. At least a portion of the exterior surface of the rotational element housing 320 can be seated against a rotational element housing radial retention surface 319 of the bearing guiding tube 310 to restrain radial motion of the rotational element housing 320. The rotational element housing 320 can be affixed in an axial position by installing any suitable mechanical fastener, including threaded fasteners (passing through apertures as shown in FIG. 7), a "C" clip (similar to the bearing outer edge retention clip 152), and the like. Other elements, such as rolling element bearing assemblies, seals, and the like can be employed in conjunction with the rotational element housing 320.

The rolling element bearing 200 is assembled to the bearing lubricating housing 100 forming a self lubricating rolling bearing subassembly 102. The self lubricating bearing subassembly 102 can be assembled to a respective end segment of a rotating machine shaft 350. The respective end segment of the rotating machine shaft 350 would be inserted through the bore defined by the bearing inner surface 250. The rolling element bearing 200 would be retained in position by assembling a bearing inner edge retention clip 150 to each side thereof. Each bearing inner edge retention clip 150 would be seated within a slot formed about a circumference of the rotating machine shaft 350. The bearing inner edge retention clip 150 can be of any suitable form factor, such as a "C" clip as shown.

Figure 11:
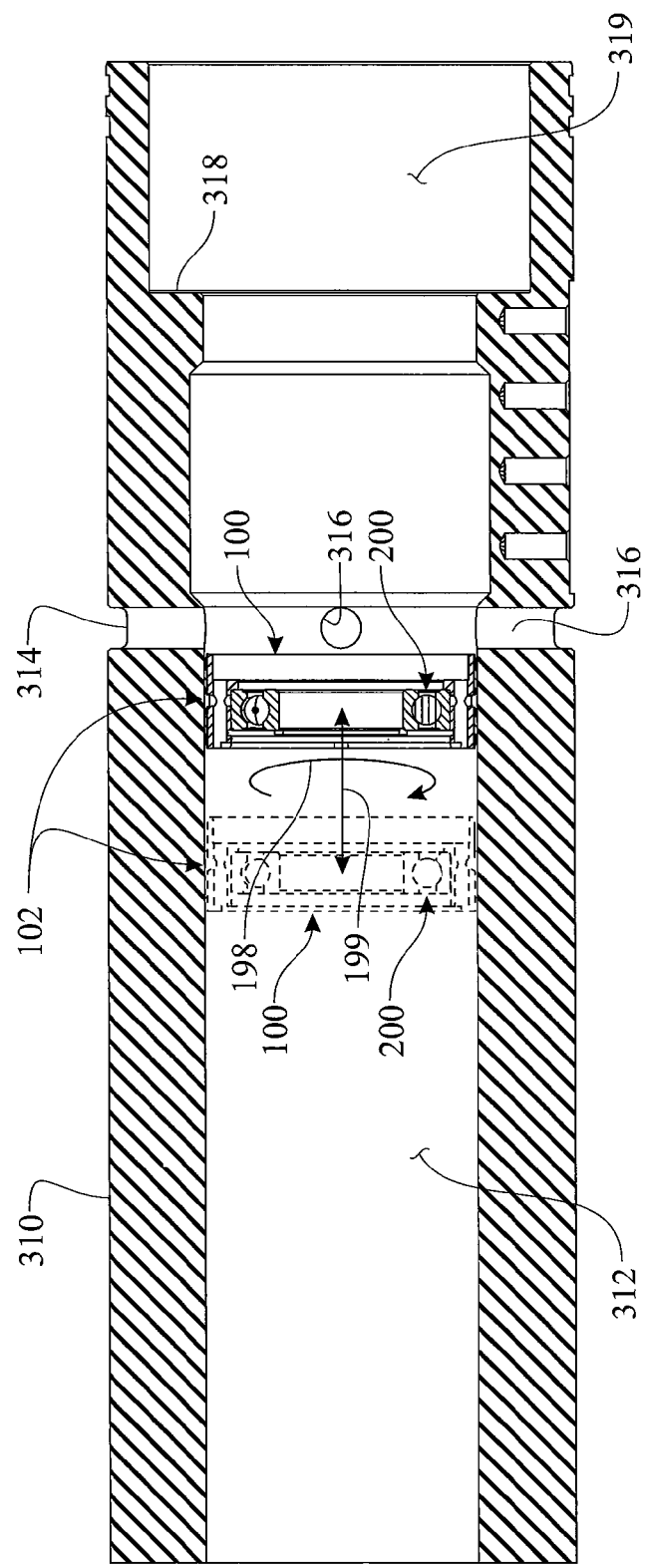
FIG. 11 presents a sectioned side assembly view of the self lubricating bearing subassembly installed within a tubular interior of the guiding tube, the illustration introducing an axial sliding motion of the self lubricating bearing subassembly therein.
Figure 12:
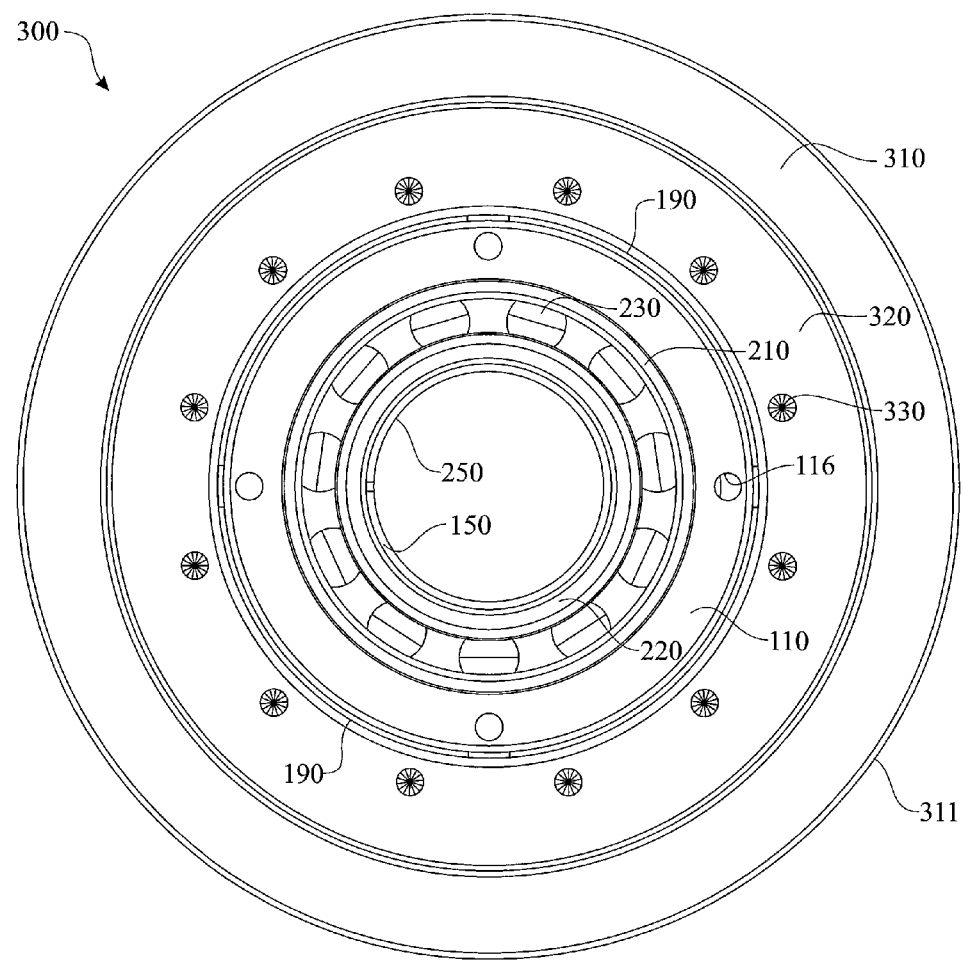
FIG. 12 presents an axial end view of the complex mechanical assembly.
Figure 13:
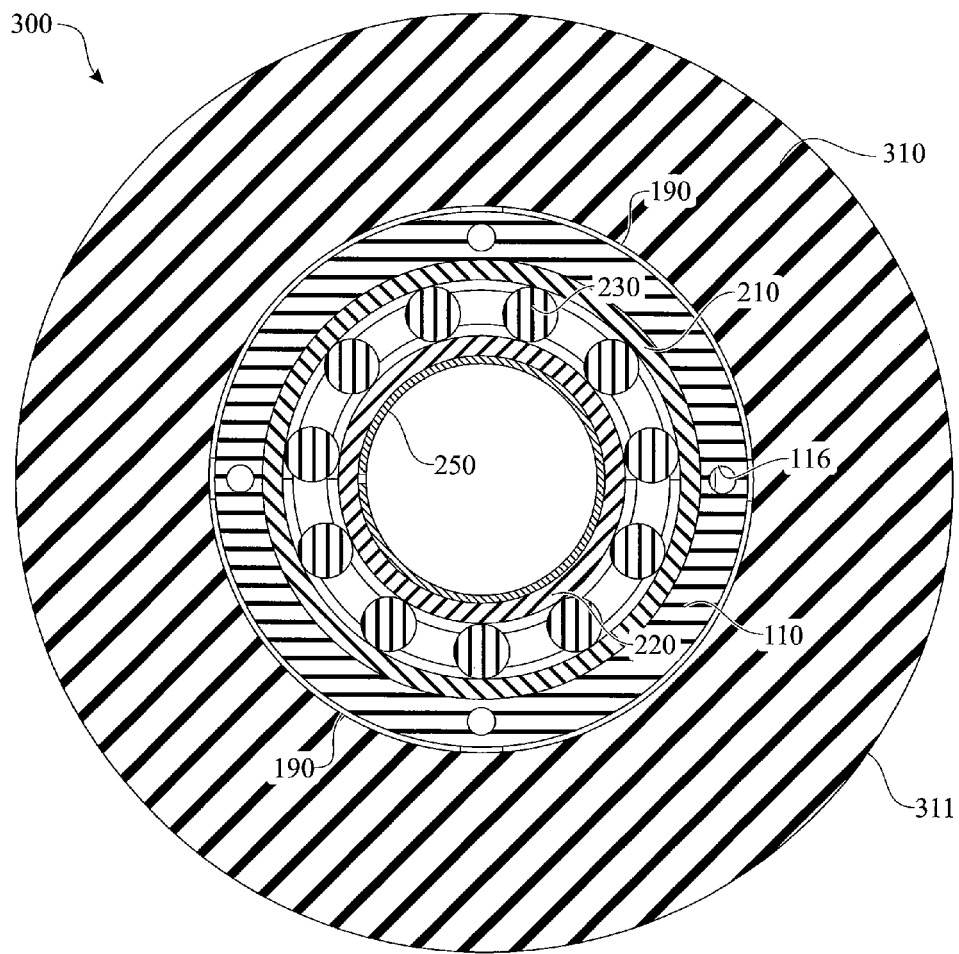
FIG. 13 presents a sectioned end view of the complex mechanical assembly, wherein the section is taken along a radial plane centrally extending through rolling elements of the bearing.

The self lubricating bearing subassembly 102 is slideably assembled within the bearing guiding tube interior surface 312 of the bearing guiding tube 310. The assembly enables both, rotational motion 198 of the rotating machine shaft 350 and translative axial motion 199 of the rotating machine shaft 350 as illustrated in FIG. 11. As the self lubricating bearing subassembly 102 moves in accordance with the bearing assembly sliding motion 199, the lubrication collection path 118 collects lubricant from the bearing guiding tube interior surface 312. Lubricant can be applied to the lubrication feed radial port 314. The lubrication feed radial port 314 is formed about an exterior circumference of the bearing guiding tube 310. The lubricant flows about the lubrication feed radial port 314 and into each respective lubrication feed axial orifice 316. Each lubrication feed axial orifice 316 provides a conduit for transport of the lubricant to the bearing guiding tube interior surface 312. As the bearing lubricating housing 100 slides against the bearing guiding tube interior surface 312, the bearing lubricating housing 100 (more specifically, each lubrication collection path 118) collects lubricant from the bearing guiding tube interior surface 312.

The rolling element bearing 200 can be designed to include an adjusted seal lip interference for grease retention and allowing oil to access the bearing. Long life grease can be packed inside the rolling element bearing 200 to further enhance longevity and reliability of the rolling element bearing 200. The bearing rotational elements 230 can be steel rolling elements, a coated steel rolling elements, ceramic rolling elements, and the like. Even using a suitable long life grease, the long life requirement of the system exceeds the grease life. The proposed lubrication system in conjunction with the grease and employment of ceramic rolling elements 230 will ensure the long life expected and will make the system work in difficult conditions. It is noted, the long life grease would be selected from any long life grease that is compatible with the oil based lubricant that would be applied to the bearing guiding tube 310.

Figure 14:
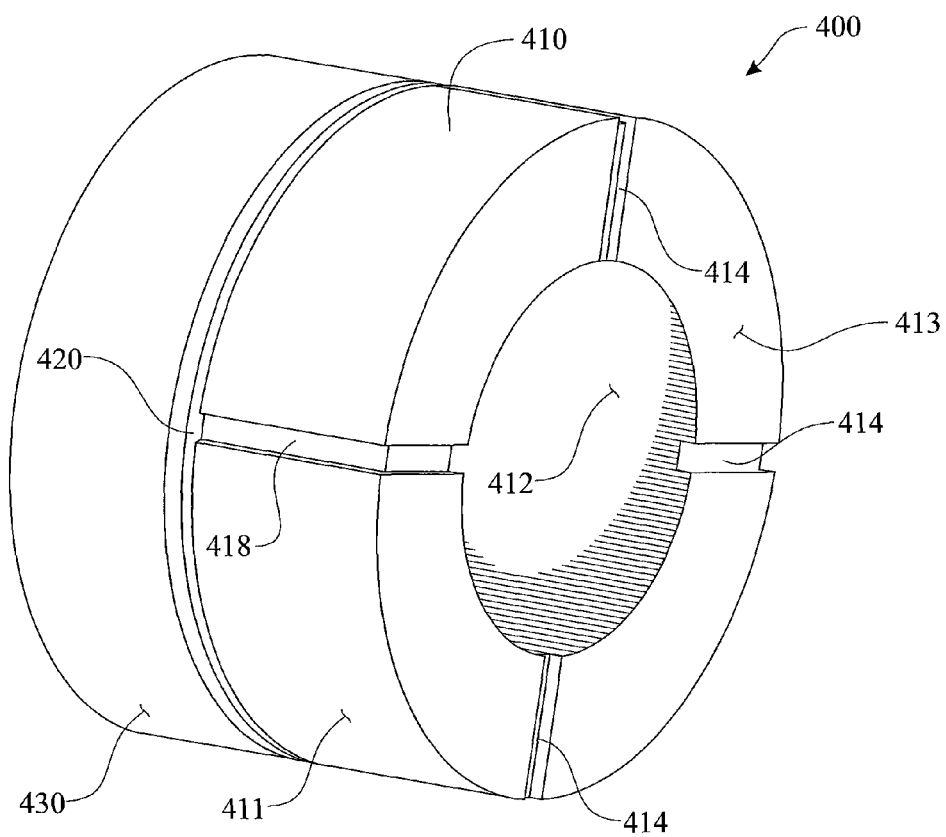
FIG. 14 presents an isometric view of a second exemplary embodiment of a lubricating sliding bearing housing.
Figure 15:
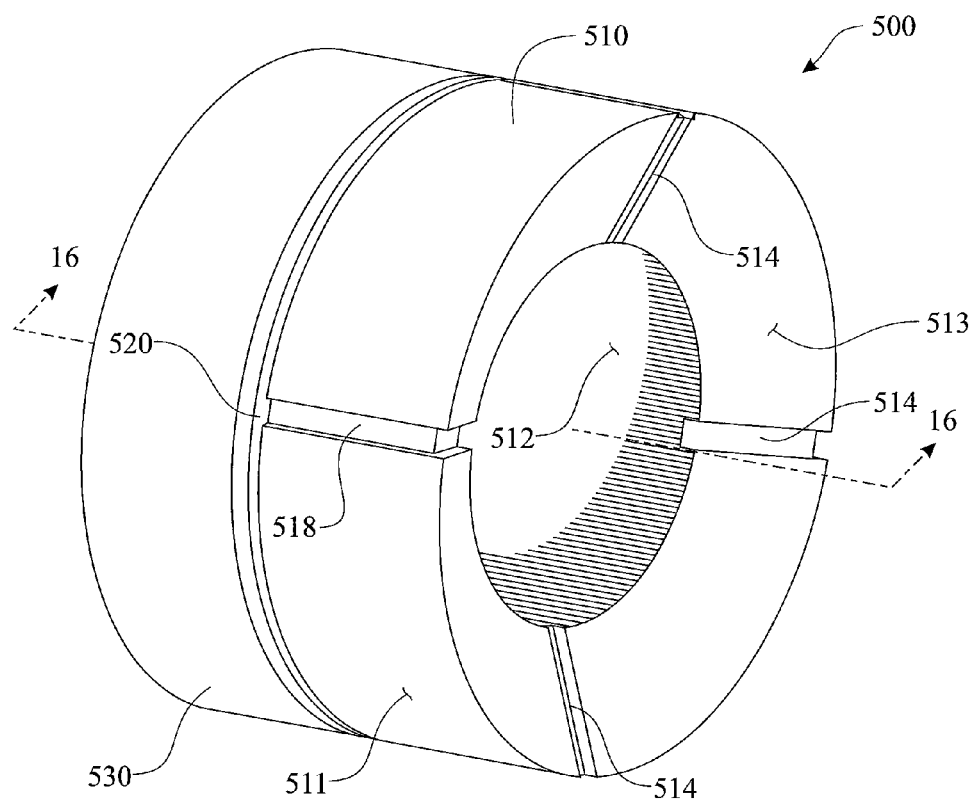
FIG. 15 presents an isometric view of an exemplary variant of the second embodiment of the lubricating sliding bearing housing.
Figure 16:
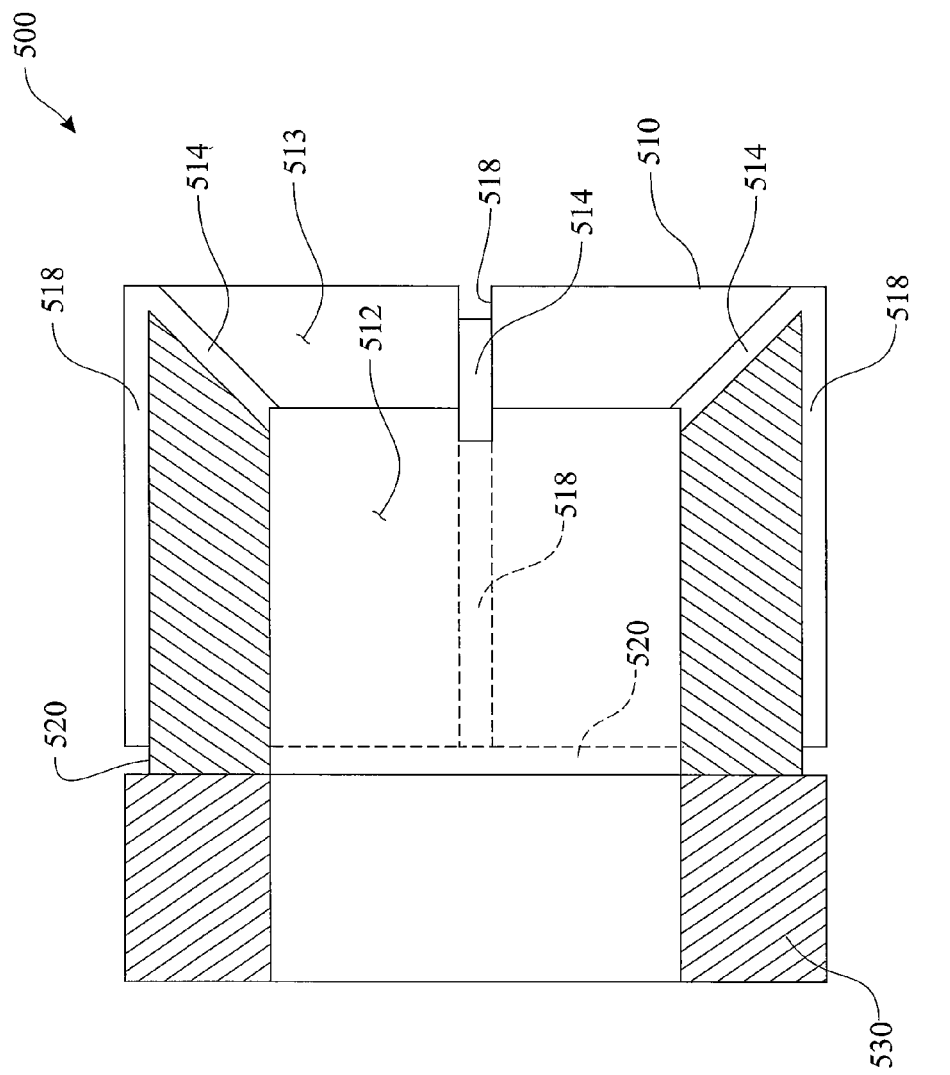
FIG. 16 presents an sectioned side view of the exemplary variant of the second embodiment of the lubricating sliding bearing housing, wherein the section is taken along section line 16-16 of FIG. 15, along a central longitudinal axis.

The concept of the bearing lubricating housing 100 can be adapted into any of a variety of suitable form factors. Two exemplary variants are presented as a bearing lubricating housing 400 illustrated in FIG. 14 and a bearing lubricating housing 500 illustrated in FIGS. 15 and 16. The like elements of bearing lubricating housing 400 and bearing lubricating housing 500 are numbered the same except preceded by a respective prefix, either numeral '4' or numeral '5'.

The bearing lubricating housing 400 includes a bearing lubricating housing body 410 having at least one axial lubrication passageway 418 and a radial lubrication passageway 414 for each at least one axial lubrication passageway 418, wherein the axial lubrication passageway 418 extends between the axial lubrication passageway 418 and the bearing lubricating housing body interior surface 412. Each radial lubrication passageway 414 is in fluid communication with the respective axial lubrication passageway 418, and more so provides fluid communication between the axial lubrication passageway 418 and the bearing lubricating housing body interior surface 412. In the exemplary embodiment, each axial lubrication passageway 418 is a groove formed generally axially along at least a portion of a length of the housing body exterior surface 411. In the exemplary embodiment, the radial lubrication passageway 414 is a groove formed generally radially along a planar bearing housing body end surface 413 of the bearing lubricating housing body 410. A circumferential lubrication collection path 420 can be provided about an external circumference of the bearing lubricating housing body 410. The circumferential lubrication collection path 420 is preferably in fluid communication with each of the axial lubrication passageways 418. In the exemplary embodiment, the axial lubrication passageways 418 are equally spaced about the circumference of the bearing lubricating housing body 410; each of the axial lubrication passageways 418 being located at each quadrant thereof. A low friction wear ring 430 can be provided about a portion of the length of the bearing lubricating housing body 410 to reduce friction between the housing body exterior surface 411 and the bearing guiding tube interior surface 312. The bearing lubricating housing body 410 is shaped having a planar bearing housing body end surface 413, wherein the plane is generally perpendicular to a longitudinal axis of the bearing lubricating housing 400.

The bearing lubricating housing 500 is similar to the bearing lubricating housing 400, wherein the bearing lubricating housing 500 includes a frustum shaped bearing housing body end surface 513. The frustum shaped bearing housing body end surface 513 is shaped extending inward from a housing body exterior surface 511 of the bearing lubricating housing body 510. Although the exemplary frustum shaped bearing housing body end surface 513 is formed having a substantially 45° angle, it is understood that the frustum shaped bearing housing body end surface 513 can be shaped having any reasonable angle for the application. The discharge end of each radial lubrication passageway 514 would be located proximate an end surface of the rolling element bearing 200. The sloped surface enhances transfer of the lubricant from the bearing guiding tube interior surface 312 to the rolling element bearing 200.

Although the bearing lubricating housing 400, 500 are illustrated having a radial lubrication passageway 414, 514 located at one end thereof, it is understood that the bearing lubricating housing 400, 500 can include a radial lubrication passageway 414, 514 located at each end thereof and the axial lubrication passageway 418, 518 would span therebetween. In another variant, the bearing lubricating housing 400, 500 would include multiple circumferential lubrication collection paths 420, 520 and the axial lubrication passageway 418, 518 would initiate at a respective circumferential lubrication collection path 420, 520 and extend axially to each respective radial lubrication passageway 414, 514 at each end of the bearing lubricating housing body 410, 510. The bearing lubricating housing 400, 500 can additionally include an axially oriented channel extending along the bearing lubricating housing body interior surface 412, 512 to transport the lubricant within the interior of the bearing lubricating housing body 510.

It is also understood that the axial lubrication passageway 418, 518 can be provided in any suitable shape, including a spiral about a circumference of the housing body exterior surface 511, a cross hatched pattern (having grooves in both circumferential and axial directions) a diagonal pattern, a diagonal cross hatched pattern, and the like. The grooves can be shaped to optimize lubricant flow and volume by utilizing any property, such as enhancing wetting or surface tension interactions, accelerating flow, and the like. This can be accomplished by tapering the grooves, forming the grooves to have a rounded cross section shape, forming the grooves to have a 'V' cross section shape, forming the grooves to have a 'U' cross section shape, forming the grooves to have a rectangular cross section shape, utilizing multiple grooves abutting one another, and the like. The grooves can progressive changed in depth, width, or both. The surface of the grooves can also be modified to optimize lubricant flow and volume.

During operation, the linear grooves/channels allow the lubricant to reach to the top of the radial bearing as the ram brings lubricant with it during its upward motion. The bearing exterior slide ring 190 can be fabricated of a carbon filled nylon ring or any other low friction coefficient material to reduce the heat generation as the ram moves past & beyond the radial bearings.

The machine assembly 300 can incorporate seals, which are designed to allow pressure variation from both sides of the rolling element bearing 200. Bearing seals (not shown) help retain the lubricant (a grease compatible with the selected lubricant or oil applied to the machine assembly 300) in the bearings for the initial phase of operation.

Once the seal starts leaking, any lubricant or oil collected through grooves/channels in radial bearing help provide lubricant for remaining phase of operation.

The grooves will also trap a volume of lubricant/oil and act as a reservoir for dispensing of a lubricant onto the rolling element bearing 200 under a condition where there is an oil starvation in the cycle of applying a lubricant to the machine assembly 300.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

LISTING OF REFERENCE NUMBERS

Ref. No. Description 100 bearing lubricating housing
102 self lubricating bearing subassembly
110 bearing lubricating housing body
114 radial lubrication passageway
116 axial lubrication passageway
118 lubrication collection path
120 bearing assembly radial seating surface
130 slide ring receiving groove
132 first slide ring registration ridge
134 second slide ring registration ridge
140 rotational element housing radial retention surface
150 bearing inner edge retention clip
152 bearing outer edge retention clip
190 bearing exterior slide ring
198 bearing assembly rotational motion
199 bearing assembly sliding motion
200 rolling element bearing
210 bearing outer ring
212 outer ring raceway
220 bearing inner ring
222 inner ring raceway
230 bearing rotational elements
250 bearing inner surface
300 machine assembly
310 bearing guiding tube
311 bearing guiding tube exterior surface
312 bearing guiding tube interior surface
314 lubrication feed radial port
316 lubrication feed axial orifice
318 housing axial retention surface
319 housing radial retention surface
320 rotational element housing
330 rotational element
350 rotating machine shaft
400 bearing lubricating housing
410 bearing lubricating housing body
411 housing body exterior surface
412 bearing lubricating housing body interior surface
413 planar bearing housing body end surface
414 radial lubrication passageway
418 axial lubrication passageway 420 circumferential lubrication collection path
430 low friction wear ring
500 bearing lubricating housing
510 bearing lubricating housing body
511 housing body exterior surface
512 lubricating housing body interior surface
513 frustum shaped bearing housing body end surface
514 radial lubrication passageway
518 axial lubrication passageway
520 circumferential lubrication collection path
530 low friction wear ring

What is claimed is:

1. A bearing housing employed to automatically lubricate a retained bearing assembly, said bearing housing comprising:
   a bearing lubricating housing body having an elongated tubular structure comprising an outer surface and an inner surface, wherein said bearing lubricating housing body inner surface comprises a bearing assembly radial seating surface that is sized and shaped to receive and radially retain a bearing assembly,
   at least one sliding surface provided on said elongated tubular structure outer surface, wherein said at least one sliding surface is sized, shaped, and fabricated of a material suitable to slideably engage with an interior surface of a guiding tube along an axial direction;
   at least one lubrication collection groove formed on said elongated tubular structure outer surface, wherein said lubrication collection groove is arranged in at least one of:
      an axial direction,
      a spiraling direction, spiraling about at least a portion of an axial length of said elongated tubular structure outer surface,
      a multi-directional pattern having grooves formed in both axial and circumferential directions, and
      a multi-directional pattern having grooves formed in a first angled direction and a second, generally perpendicular angled direction; and
   a radial conduit extending between a respective lubrication collection groove of said at least one lubrication collection groove and at least one of said elongated tubular structure inner surface and an axial lubrication passageway, wherein said axial lubrication passageway extends axially through said elongated tubular structure.

2. The bearing housing as recited in claim 1, wherein said at least one sliding surface is fabricated of a slide ring and said slide ring is assembly about an exterior circumference of said bearing lubricating housing body.

3. The bearing housing as recited in claim 1, wherein each of said radial lubrication passageways extends through said bearing lubricating housing body, enabling discharge of lubricant at said bearing lubricating housing body interior surface.

4. The bearing housing as recited in claim 1, wherein each of said at least one lubrication collection grooves extends an axial length of said bearing lubricating housing body exterior surface.

5. The bearing housing as recited in claim 1, further comprising a circumferential lubrication collection path, wherein each of said at least one lubrication collection grooves along said bearing lubricating housing body exterior surface, extending between said circumferential lubrication collection path and at least one end of said bearing lubricating housing body.

6. The bearing housing as recited in claim 1, wherein each of said radial lubrication passageways extends along an end surface said bearing lubricating housing body, enabling discharge of lubricant proximate a face of said bearing assembly.

7. The bearing housing as recited in claim 6, wherein said end surface said bearing lubricating housing body comprising said radial lubrication passageways, is fabricating having one of:
   a planar shape, and
   a frustum shape, wherein a smaller portion of said frustum shape extends inward.

8. A bearing subassembly comprising:
   a rolling element bearing comprising:
      an outer ring having an outer peripheral surface and an outer ring raceway,
      an inner ring having an inner peripheral surface defining a bore and an inner ring raceway, and
      a plurality of rolling elements assembled between said outer ring raceway and said inner ring raceway; and
   a bearing housing comprising:
      a bearing lubricating housing body having an elongated tubular structure comprising an outer surface and an inner surface, wherein said bearing lubricating housing body inner surface comprises a bearing assembly radial seating surface that is sized and shaped to receive and radially retain said bearing assembly,
      at least one sliding surface provided on said elongated tubular structure outer surface, wherein said at least one sliding surface is sized, shaped, and fabricated of a material suitable to slideably engage with an interior surface of a guiding tube along an axial direction,
      at least one lubrication collection groove formed on said elongated tubular structure outer surface, wherein said lubrication collection groove is arranged in at least one of:
         an axial direction,
         a spiraling direction, spiraling about at least a portion of an axial length of said elongated tubular structure outer surface,
         a multi-directional pattern having grooves formed in both axial and circumferential directions, and
         a multi-directional pattern having grooves formed in a first angled direction and a second, generally perpendicular angled direction, and
      a radial conduit extending between a respective lubrication collection groove of said at least one lubrication collection groove and at least one of said elongated tubular structure inner surface and an axial lubrication passageway, wherein said axial lubrication passageway extends axially through said elongated tubular structure;
   wherein said bearing assembly is seated within said bearing assembly radial seating surface of said bearing lubricating housing body.

9. The bearing subassembly as recited in claim 8, wherein said at least one sliding surface is fabricated of a slide ring and said slide ring is assembly about an exterior circumference of said bearing lubricating housing body.

10. The bearing subassembly as recited in claim 8, wherein each of said radial lubrication passageways extends through said bearing lubricating housing body, enabling discharge of lubricant at said bearing lubricating housing body interior surface.

11. The bearing subassembly as recited in claim 8, wherein each of said at least one lubrication collection grooves extends an axial length of said bearing lubricating housing body exterior surface.

12. The bearing subassembly as recited in claim 8, further comprising a circumferential lubrication collection path, wherein each of said at least one lubrication collection grooves along said bearing lubricating housing body exterior surface, extending between said circumferential lubrication collection path and at least one end of said bearing lubricating housing body.

13. The bearing subassembly as recited in claim 8, wherein each of said radial lubrication passageways extends along an end surface said bearing lubricating housing body, enabling discharge of lubricant proximate a face of said bearing assembly.

14. The bearing subassembly as recited in claim 13, wherein said end surface said bearing lubricating housing body comprising said radial lubrication passageways, is fabricating having one of:
   a planar shape, and
   a frustum shape, wherein a smaller portion of said frustum shape extends inward.

15. A machine assembly incorporating at least one rotation and axially moving element, said machine assembly comprising:
   a rolling element bearing comprising:
      an outer ring having an outer peripheral surface and an outer ring raceway,
      an inner ring having an inner peripheral surface defining a bore and an inner ring raceway, and
      a plurality of rolling elements assembled between said outer ring raceway and said inner ring raceway;
   a bearing housing comprising:
      a bearing lubricating housing body having an elongated tubular structure comprising an outer surface and an inner surface, wherein said bearing lubricating housing body inner surface comprises a bearing assembly radial seating surface that is sized and shaped to receive and radially retain said bearing assembly,
      at least one sliding surface provided on said elongated tubular structure outer surface,
      at least one lubrication collection groove formed on said elongated tubular structure outer surface, wherein said lubrication collection groove is arranged in at least one of:
         an axial direction,
         a spiraling direction, spiraling about at least a portion of an axial length of said elongated tubular structure outer surface,
         a multi-directional pattern having grooves formed in both axial and circumferential directions, and
         a multi-directional pattern having grooves formed in a first angled direction and a second, generally perpendicular angled direction, and
      a radial conduit extending between a respective lubrication collection groove of said at least one lubrication collection groove and at least one of said elongated tubular structure inner surface and an axial lubrication passageway, wherein said axial lubrication passageway extends axially through said elongated tubular structure;

wherein said bearing assembly is seated within said bearing assembly radial seating surface of said bearing lubricating housing body; and a bearing guiding tube formed having an elongated tubular structure comprising an exterior surface and an inner surface, wherein said bearing guiding tube inner surface is sized and shaped to receive and radially retain said bearing lubricating housing and a lubrication transfer system for transferring a lubricant from said bearing guiding tube exterior surface to said bearing guiding tube inner surface, wherein said bearing lubricating housing is slideably assembled within said bearing guiding tube inner surface.

16. The machine assembly as recited in claim 15, said lubrication transfer system further comprising a lubrication feed groove, wherein said lubrication feed groove circumscribes said bearing guiding tube exterior surface; and
   at least one lubrication feed orifice extending radially between said lubrication feed groove and said bearing guiding tube inner surface.

17. The machine assembly as recited in claim 15, wherein said at least one sliding surface is fabricated of a slide ring and said slide ring is assembly about an exterior circumference of said bearing lubricating housing body.

18. The machine assembly as recited in claim 15, wherein each of said radial lubrication passageways extends through said bearing lubricating housing body, enabling discharge of lubricant at said bearing lubricating housing body interior surface.

19. The machine assembly as recited in claim 15, wherein each of said at least one lubrication collection grooves extends an axial length of said bearing lubricating housing body exterior surface.

20. The machine assembly as recited in claim 15, further comprising a circumferential lubrication collection path, wherein each of said at least one lubrication collection grooves along said bearing lubricating housing body exterior surface, extending between said circumferential lubrication collection path and at least one end of said bearing lubricating housing body.

21. The machine assembly as recited in claim 15, wherein each of said at least one lubrication collection grooves extends an axial length of said bearing lubricating housing body exterior surface.

22. The machine assembly as recited in claim 15, wherein each of said radial lubrication passageways extends along an end surface said bearing lubricating housing body, enabling discharge of lubricant proximate a face of said bearing assembly.

23. The machine assembly as recited in claim 22, wherein said end surface said bearing lubricating housing body comprising said radial lubrication passageways, is fabricating having one of:
   a planar shape, and
   a frustum shape, wherein a smaller portion of said frustum shape extends inward.

* * * * *